(12) United States Patent
Caudrelier et al.

(10) Patent No.: US 6,704,888 B1
(45) Date of Patent: Mar. 9, 2004

(54) PROCESS AND TOOL FOR ANALYZING AND LOCATING HARDWARE FAILURES IN A COMPUTER

(75) Inventors: Christian Caudrelier, Clais (FR); Philippe Garrigues, Montbonnot (FR); Eric Espie, Villard de Lans (FR); Christian Randon, Seyssinet (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/499,741

(22) Filed: Feb. 8, 2000

(30) Foreign Application Priority Data

Feb. 8, 1999 (FR) .......................................... 99 01448

(51) Int. Cl.[7] .............................................. G06F 11/00
(52) U.S. Cl. ........................... 714/37; 714/26; 703/21
(58) Field of Search ............................ 714/37, 26, 45, 714/27; 706/48, 52, 47; 703/21

(56) References Cited

U.S. PATENT DOCUMENTS

| | | | | |
|---|---|---|---|---|
| 4,649,515 A | | 3/1987 | Thompson et al. | |
| 4,964,125 A | * | 10/1990 | Kim ............................ | 714/26 |
| 5,164,912 A | | 11/1992 | Osborne et al. | |
| 5,394,543 A | * | 2/1995 | Hill et al. ..................... | 714/26 |
| 5,548,714 A | * | 8/1996 | Becker ......................... | 706/11 |
| 5,944,839 A | * | 8/1999 | Isenberg ....................... | 706/47 |
| 6,041,425 A | * | 3/2000 | Kokunishi et al. ........... | 709/101 |
| 6,105,149 A | * | 8/2000 | Bonissone et al. ............ | 706/62 |
| 6,119,246 A | * | 9/2000 | McLaughlin et al. ......... | 714/27 |
| 6,401,219 B1 | * | 6/2002 | Shigeta ........................ | 706/50 |
| 6,430,707 B1 | * | 8/2002 | Matthews et al. ............ | 710/11 |
| 6,442,542 B1 | * | 8/2002 | Ramani et al. ............... | 706/47 |
| 6,539,429 B2 | * | 3/2003 | Rakavy et al. .............. | 709/224 |
| 6,587,960 B1 | * | 7/2003 | Barford et al. ................ | 714/8 |

* cited by examiner

*Primary Examiner*—Robert Beausoliel
*Assistant Examiner*—Marc M Duncan
(74) *Attorney, Agent, or Firm*—Miles & Stockbridge P.C.; Edward J. Kondracki

(57) ABSTRACT

A process, a tool and a computer for analyzing and locating hardware failures in a computing machine storing information on operational errors generated by the various sensible hardware components of the machine, characterized in that it consists of creating a man/machine interface (I) through which the components and the rules for interpreting errors are described in a structural language and used by the machine as external parameters in correlation with the error information to detect the malfunctioning component or components. The preventive process is particularly adopted for computer hardware maintenance.

26 Claims, 1 Drawing Sheet

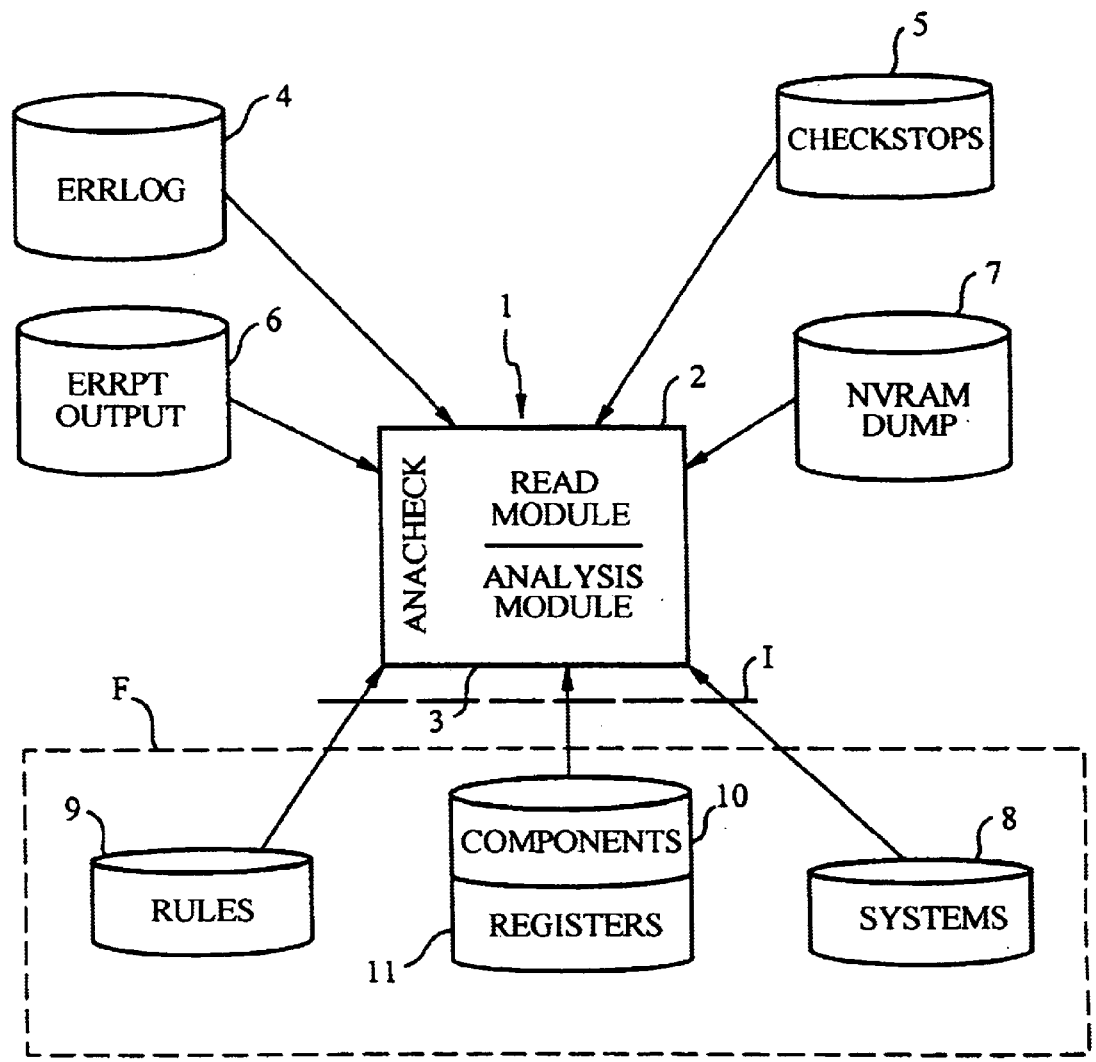
SOLE FIGURE

PROCESS AND TOOL FOR ANALYZING AND LOCATING HARDWARE FAILURES IN A COMPUTER

FIELD OF THE INVENTION

The field of the present invention is the troubleshooting of hardware failures and the maintenance of computers.

More particularly, it relates to a process for analyzing information that is recorded the moment a malfunction is detected in the computer, in order to locate the component or components that caused the failure and to replace only the malfunctioning components.

It also relates to a tool for analyzing and locating failures and a computer that incorporates the tool.

DESCRIPTION OF RELATED ART

The constant decrease in the price of computing machines sometimes leads manufacturers to lower the quality of certain hardware components.

A component can be, for example, an ASIC or "Application Specific Hardware Circuit," or a processor.

The user is therefore more and more frequently confronted with problems linked to hardware-related errors. All of the current machines are more or less capable of finding these errors, which can sometimes lead to failures in certain parts of the machine, or to a complete shutdown of the machine.

Each sensible component of a machine has status registers indicating the performance level of the component in question.

A given status of the machine is characterized by a "signature" of its status registers, i.e., a characteristic value of each register for this given status.

It is these values that constitute the information that will subsequently be analyzed by the machine.

It is possible to distinguish several types of failures in a computing machine.

In a first type, the failure causes a minor error that remains localized at the component level and is immediately corrected by the software that controls this component, and therefore the user does not experience any disturbance of his work.

In a second type, the failure can cause an error whose seriousness makes it no longer possible to guarantee the integrity of the data processed and may make it necessary to restart the machine.

The present invention relates more specifically, though not exclusively, to this second type of failure, which can cause interruptions in the operation of the machine, also known by the respective terms "machine check" and "checkstop."

In the case of an interruption of the "machine check" type, the information collected is targeted to the component that detected the error, while in the case of an interruption of the "checkstop" type, all the "signatures" of the status registers of the machine are collected.

In both cases, it is then necessary to interrupt the values of the status registers in order to determine the error and possibly deduce its cause.

Each component of the machine is more or less directly linked to one or more other components of this machine, which will be called "neighbor components." If a component has a defect, it is revealed by the neighbor components in their status registers. The user is then warned that there has been a failure in the machine, but in certain cases, there is nothing that allows him to know exactly which component is the defective one that caused the error.

There is still the signature of the status registers of the machine in case of error, but not an overall view of the status of the machine. There is a gap in the information. The information known is precise, but partial (the status registers) and global, but imprecise (there is an operational error). When the error results in a hard stop of the machine, it is necessary to pore through a thick manual to find the meaning of the status registers. It requires the help of an expert to perform a global analysis of these registers a posteriori.

The existing error analysis tools can provide all of the values of the registers in text form and can even perform the analysis of these values. However, the description of the status registers and the rules for interpreting their contents are buried in the machine code of these tools.

Since a tool is generally dedicated to one hardware version, it is not possible to add new descriptions of registers or new rules of interpretation without creating a new version of the tool.

SUMMARY OF THE INVENTION

The object of the invention is to specifically eliminate these drawbacks.

To this end, the subject of the invention is a process for analyzing and locating hardware failures in a computing machine storing information on operational errors generated by the various sensible hardware components of the machine.

It is characterized in that it consists of creating a man/machine interface through which the components and the rules for interpreting errors are described in a structured language and used by the machine as external parameters in correlation with the error information to detect the malfunctioning component or components.

Another subject of the invention is a tool for analyzing and locating hardware failures in a computing machine comprising means for storing error information generated by the sensible components of the machine.

It is characterized in that it includes an error analysis engine receiving through a first series of inputs the error information, and receiving through a second series of inputs the parameters required for the description of the sensible components of the machine and for the description of the rules for interpreting errors, and in that it includes a man/machine interface between the tool and the component expert to allow him to formulate the parameters in a structured language.

Finally, another subject of the invention is a computer that incorporates the tool defined above.

The formulation of the parameters for describing the registers and the rules for interpreting errors according to the invention makes it possible to add new descriptions or to enrich the interpretation simply by editing source files written in a given format, without having to create a new version of a tool with each hardware upgrade.

Moreover, the architecture of the tool according to the invention is scalable and its maintenance is facilitated by separating the analysis tool itself (the engine), which processes the information in "machine" code, from the descriptions of the status registers and the interpretation rules written in "source" code.

BRIEF DESCRIPTION OF THE DRAWINGS

Other characteristics and advantages of the invention will become clear through the reading of the following description and the attached FIGURE, which represents the general architecture of an analysis tool according to the invention.

The tool according to the invention is organized around an analysis engine ANACHECK 1. It includes a read module 2 and an analysis module 3. The analysis engine ANACHECK 1 is a standard component.

The read module 2 receives through a first series of inputs, in the form of binary and ASCII files, all of the recorded information issued by the various error detecting means of the machine.

Four of the main error files containing information on errors that have occurred during the operation of the machine, and considered for a given time period, are represented in the FIGURE: the ERRLOG file 4, the CHECKSTOPS file 5, the ERRPT OUTPUT file 6 and the NVRAM DUMP file 7.

The ERRLOG file 4 is a binary error file. It contains in the form of a log a certain amount of information on errors, including errors of the "machine check" type.

The CHECKSTOPS file 5 is a binary error file. It alone contains all the information on errors of the "checkstop" type that have resulted in a hard stop of the machine.

The NVRAM DUMP file 7 (Non-Volatile RAM dump) is a binary error file. It contains the error information provided by the service processor. This information can be recorded on a diskette and analyzed in another machine when the source machine is unavailable for the analysis.

The ERRPT OUTPUT file 6 is an error file in the ASCII format.

It contains the same errors as the ERRLOG file 4, but expressed in ASCII. It is intended to be read by the administrator of the machine or the maintenance operator.

The analysis module 3 receives through a second series of inputs, in the form of "source" files 8 through 11 outside the engine ANACHECK 1, all the parameters required for the description of the status registers and their contents, and for the definition of the interpretation rules.

The analysis is based on an identification of the status registers of the machine.

In the case of simple errors, the translation is performed directly by the engine ANACHECK 1.

In the case of more serious errors of the "checkstop" and "machine check" type, a detailed analysis of the status registers is necessary.

This analysis makes a correlation between all of the error information collected in the error files 4 through 7 and all of the rules for describing status registers and interpreting errors, contained in the parameter files, in order to locate the defective component or components.

The main parameter files used, which feed the analysis module 3 of the engine ANACHECK 1, are the SYSTEMS file 8, the RULES file 9, the COMPONENTS file 10, and the REGISTERS file 11.

The SYSTEMS file 8 contains a list of the identifiers of the various machines for which the engine is capable of analyzing failures, and a means for identifying the machine being analyzed.

The RULES file 9 is the basic file required for the analysis. It includes all the parameters for describing the status registers and the interpretation rules.

It is composed of three main parts:
a first part includes an address table of the status registers of the machine, which makes it possible to define the structure of the registers and to access the registers that have detected an error;
a second part includes the description of the content of the registers (the signature); and
a third part includes all of the rules for extracting the essential information, i.e., the location of the failures, from the signatures of certain registers.

The COMPONENTS file 10 is associated with the REGISTERS file 11. It lists all the hardware components of the machine.

The associated REGISTERS file 11 contains all the coordinates of the registers of the hardware components listed in the COMPONENTS file 10.

The identification of a register or a part of a register uses a known method consisting of masking binary elements (or bits). For a given hardware component, it is possible to have one or more described registers or parts of registers.

The description parameters are entered into files 8 through 11, in a given format, by the designers of the microprograms that are associated with each hardware component of the machine and that contain a set of fixed data, or statuses, defining this component. These microprograms are better known by the term "firmware" and the designers are often designated by the term specialists or experts.

When dealing with a particular problem, the experts do not need to consult all of the status registers of the machine in their entirety.

They generally only consult a few parts of certain registers. On the other hand, they must precisely describe the status of a set of registers of the machine as a function of the errors that can occur, and must specify the source of each error as a function of the status of the registers.

These descriptions are expressed in a given syntax, which constitutes a structured description language readable by the analysis module 3 of the engine ANACHECK 1.

The set of parameter files 8 through 11 defines an electronic file F, delimited in the FIGURE by a closed broken line, and can be carried, for example, by a removable medium, not represented.

This characteristic is advantageous because it makes it possible to use the same electronic description file F to analyze another machine of the same type.

The tool according to the invention therefore introduces a user interface, or man/machine interface I, that allows an expert to access the sensible components of the machine from outside the machine. This interface is represented in the FIGURE by a straight broken-line segment between the analysis module 3 and the file F.

The main files are used in the following order:
1. the COMPONENTS file 10 is used to store in memory the values of all the registers of the sensible components of the machine;
2. the REGISTERS file 11 is used to display the meaning of all the status bits identified by the error information; and
3. the RULES file 9 is used to determine the hardware component that caused the failure from the rules for interpreting errors.

The syntax used for these three main parameter files uses the following expressions:
Relative to the masks:
[n] is the mask equal to $2^n$;
[n1, n2, . . . ] is the mask equal to $2^{n1} | 2^{n2} | \ldots$; and
[n1–n2] is the mask equal to $2^{n1} | 2^{(n1+1)} \ldots | 2^{n2}$.

For example, the mask [0–2, 10] corresponds to the 64-bit word 11100000 00100 . . . 0.

Relative to the registers:

<component>:<register>designates a register of a component. It is used in the REGISTERS file 11. For example: SMC2:GSR;

<component>*<occurrences>:<register>designates the multiple occurrences of a register. For example, CPU*4:SRR1;S[mask] is used in the definition of the registers to designate the current register in the REGISTERS file 11. This notation is only used with a mask. For example $ [0–7] corresponds to the first 8 bits of the current register;

<component>:<register>[mask] designates the following value: value of the register and value of the mask.

For example, SMC2:GSR=0×c00000 gives SMC2:GSR [1]=0×800000.

The parameters are expressions that manipulate the values of registers, masks, constants and occurrence indexes.

These expressions manipulate the following operators:

| corresponds to a binary OR;

& corresponds to a binary AND;

( ) corresponds to opening and closing parentheses, respectively;

>> corresponds to a binary shift to the right;

<< corresponds to a binary shift to the left; and

* designates the occurrence index.

For example:

(SMC2:M_ADDR[4]>>59)|(SMC2:M_ADDR[0–2]>>60)

The "parameter" type is "unsigned long long". It represents a data type that is an unsigned integer coded into 64 bits. It must be used with the parameters %11× in the character strings.

For example, the following expression

"mem0:bank#%11×", (SNC2:M_ADDR[4]>>59)|(SNC2:M_ADDR[0–2]>>60)

makes it possible to print the message with the number of the corresponding memory bank. A memory bank exists in the form of strips of memory, which must be installed together in order for the machine to run.

These memory banks are easily findable by the technicians who perform the maintenance.

The condition operators are boolean expressions, implicitly compared to 0. The result is "true" if the expression is different from zero and false if not.

The accepted condition operators are the following:

|| corresponds to a logical OR;

&& corresponds to a logical AND;

++ corresponds to an equality;

! corresponds to a logical NO; and ( ) corresponds to opening and closing parentheses, respectively.

The utilization of masked registers, constants and masks is authorized.

For example, in a REGISTERS file 11, one condition could be:

!((S[0–31]==0||($[0–31]==[0–31]))

This indicates that the first 32 bits of the current register must have a value different from 0 to 0×FFFFFFFF.

For example, in the RULES file 9, one condition could be:

((DCBK*:GSR[2,10])||((!SMC2:GSR[1]&&(DCBK*GSR[1,9]))

This indicates that if the second or tenth bit of the register GSR of the current occurrence of DCBK is present, or if the first or ninth bits of the register are present and not the first bit of the register GSR of the component SMC2, then the condition is true (and the corresponding component DCBANK is malfunctioning).

The COMPONENTS file 10 contains the description of all the accesses to the registers of the hardware components of the machine whose registers have been copied into the error files.

This description makes it possible to access the registers in order to analyze them.

A syntax for the COMPONENTS file 10 beings with:

//System: <SYS>Release: <version> followed by:

```
// comment
COMP> component_name[* occurrences]: signature
{
register_name1: offset_in_bytes, width in bits;
register_name2: offset_in_bytes, width in bits;
. . .
}
``` in which:

component_name corresponds to the name of the component described;

occurrences corresponds to an optional field used to factor several components (DCBK(2*), CPUs(*4) . . . ) into a single definition;

signature corresponds to the signature of the component;

register_name corresponds to the name of the register defined;

offset_in_bytes corresponds to the offset, expressed in bytes, from the beginning of the data of the registers copied into the file for this component. This offset corresponds, for example, to a offset in the structure of the service processor of the corresponding ASIC.

width-in_bits corresponds to the length of the register expressed in bits (1–64).

It is not necessary to describe the registers of all the components, but all of the registers used must be described. In fact, there are many registers that are copied into the error files, but only a few of them are used for the analysis.

Given below is an example of a file for describing several components ARB, SMC2, DCBK, DPCI, and CPU620 using the syntax defined above:

```
COMP> ARB:2
{
CHIP_ID : 0,8;
GSR :1,8;
PROCERR :2,14;
}
```

The component considered above is an ASIC named ARB (Arbiter of the system bus).

ARB:2 indicates that the code of the record in the error files is 2.

CHIP_ID corresponds to the name of a register of the ARB.

CHIP_ID:0,8; indicates that the location of the register CHIP_ID in the record of the error related to ARB is located at byte 0 (hence at the beginning of the register) and that the register has a length of 8 bits.

The same description is then created for the other registers of the component and for the other components.

```
COMP> SMC2:3
{
CHIP_ID :0,8;
GSR :4,24;
S_ADDR :8,39;
M_ADDR :16,39;
}
COMP> DCBK*2:4 // INDEXED COMPONENT
{
CHIP_ID :0,8;
GSR :2,16;
S_SYND :4,16;
M_SYND :6,16;
}
COMP>DPCI:5
{
CHIP_ID :0,8;
DPCI_ERR :1,8;
PCI_A_ERR:4,64;
PCI_B_ERR:12,64;
MERR_AD: 20,64;
EXT_ERR: 28, 64;
}
COMP> CPU620*4:1
{
HIDO :540,32;
PVR :688,32;
SRR1 :612,32;
BUSCSR :544,32;
COMP>ARB:2
{
CHIP_ID :0,8;
GSR :1,8;
PROCERR :2,14;
}
COMP> SMC2:3
{
CHIP_ID :0,8
GSR :4,24;
S_ADDR :8,39;
M_ADDR :16,39;
}
COMP> DCBK*2:4 //INDEXED COMPONENT
{
CHIP_ID :0,8;
GSR :2, 16;
S_SYND :4, 16;
M_SYND:6, 16;
}
```

In the example of the description of the component DCBK given above, *2 indicates that there are two ASICs in the machine.

```
COMP> DPCI:5
{
CHIP_ID :0,8;
DPCI_ERR :1,8;
PCI_A_ERR :4,64;
PCI_B_ERR: 12,64;
MERR_AD :20,64;
EXT_ERR :28,64;
}
COMP> CPU620*4:1
{
HIDO :540,32;
PVR :688,32;
SRR1 :612,32;
BUSCSR :544,32;
}
```

The REGISTERS file 11 is used to describe the status bits of the registers of the ASIC copied into the error files.

This description is used by the analysis engine ANACHECK 1 to display the symptoms found for an error.

A syntax for the REGISTERS file 11 begins with:

//System: <SYS>Release: <version> followed by:

```
// comment
REG>component [*occurrences]:register[,component
[*occurrences]:register, . . . ]
   [IF> condition]
   {
   condition "status bit description"[, parameters];
   . . .
   }
``` in which:

component corresponds to the name of the component;

occurrences corresponds to an optional field used to factor several components (DCBK, CPUs) into a single definition;

register corresponds to a register name of the component;

condition corresponds to a boolean expression that indicates whether the result of the operation "value of the current register AND a binary mask" is null (false) or non-null (true).

For example, $[0–2,10] corresponds to a condition for which we take the value of the current register AND the mask 111000000010000 . . . 0 (64 bits long). If the value for this mask is different from 0, then the result is "true";

parameters corresponds to a list of numeric values separated by commas (,). The star (*) represents the current value of the index in the case of index registers.

Given below is an example of a file describing several registers using the same syntax defined above:

```
REG> ARB:CHIP_ID
{
$[0–7] " ";
REG> DCBK*2; CHIP_ID
{
$[0–7] " ";
}
REG> CPU620*4:HIDO
{
$[0–31] == 0 "CPU#%11X not present or disabled, *;
$ [0–31 == [0–31] "No response from CPU#%11x", *;
!(($[0–31] == 0) || ($[0–31] == [0–31])) "CPU#%11x
   started", *;
}
REG> DPCI:PCI_A_ERR, DPCI:PCI_B_ERR
IF> (DPCI:EXT_ERR[42,46]
{
$[0–31] "PCI Address = 0x%8.811x", $[0–31] >>32;
$[57] "root cause: Retry Error";
$[58] "root cause: Master Abort";
$[59] "root cause" Target Abort";
. . .
$[52–55] == [52,53,54] "PCI CBE; Memory Read Line";
$[52–55] == [52,53,54,55] "PCI CBE: Memory Write and
   Invalidate";
}
```

In the above example "No response from CPU#%11x", *, the screen will display the following message, in the case where the condition is verified for the index 3, i.e.: "No response from CPU#3", followed by the character string %11 x, which is automatically replaced by the numerical value of the parameter (* in this case).

The RULES file 9 contains the description of the rules for interpreting errors. It is used by the engine ANACHECK 1 to locate the defective component or components by considering the values of the status registers copied into the error files. All of the registers accessed must be declared in the COMPONENTS file 10.

The syntax for the COMPONENTS file 10 begins with:

//System: <SYS> Release: <version> followed by:

```
// comment
RULE> rule_name[* occurrences]
FIAB> fiab_percent_of_the_location
PLOC> " physical_location_code"[, parameters];
{
condition
}
"location_text"[, parameters][, &];
``` in which:

rule_name corresponds to the name of the rule;

occurrences corresponds to an optional field used to factor several components (DCBK(*2), CPUs(*4) . . . ) into a single definition;

fiab_percent corresponds to the percentage of reliability of the location expected by the expert;

physical_location_code corresponds to a comma (,) used as a separator in a list of physical location codes and optional parameters; the characters string is formatted with the rules of a program interface "printf", which makes it possible to display the character string on a screen, and the register and index values are unsigned long long, (%11x);

parameters corresponds to a comma (,) used as a separator in a list of expressions or indices (*).

condition corresponds to a boolean expression that indicates whether the result of the operation "value of the current register AND a binary mask" is null (false) or non-null (true).

For example, $[0–2,10] corresponds to a condition for which we take the value of the current register AND the mask 111000000010000 . . . 0 (64 bits long). If the value for this mask is different from zero, then the result is "true."

location_text corresponds to a character string formatted with the rules of a program interface "printf", which makes it possible to display the character string on a screen, %11x is used for parameters of the unsigned long long type.

Given below is an example of a file for describing several rules using the syntax defined above:

```
RULE> DCBK_ERROR*2
FIAB> 20
PLOC> "U1.B-P1";
{
(DCBK*:GSR[2,10]) ||
((!SMC2:GSR[1] && (DCBK*:GSR[1,9]))
}
"sysplanar0: DCBK#%11x", *;
RULE> MEMORY_ERROR
FIAB> 90
PLOC> "U1.B-P1-M%11X", (SMC2:M_ADDR[4] >> 59 | (SMC2:M_ADDR[0–2] >> 60);
{
SMC2:GSR[1] &&
{DCBK*0:GSR[1,9] || DCBK*1:GSR[1,9]
}
"mem0: BANK %11X", (SMC2:M_ADDR[4] >> 59 |
```

-continued

```
(SMC2:M_ADDR[0–2] >> 60);
RULE> SMC2_ERROR
FIAB> 20
PLOC> "U1.B-P1";
{
SMC2:GSR[2] ||
(SMC2:GSR[1] && ! (DCBK*0:GSR[1,9] || DCBK*1:GSR[1,9]))
||
DPCI:DPCI_ERR[2] ||
(! ARB:PROCERR[0–9] && ARB:GSR[0–2])
}
"sysplanar0: SMC2".
```

The SYSTEMS file 8 lists the types of machines with their identification code VPD, for "Vital Product Data," which corresponds to the machine's configuration information: the type, the model, the serial number, the manufacturer, etc. This information is stored in a database of the machine.

The SYSTEMS file 8 is used to display the type of machine for which the analysis is being performed. This information is useful when the analysis of the errors is performed in another machine.

The syntax for the SYSTEMS file 8 begins with:

//System: gen Release: <version> followed by:

3 or 4 digits defining the type of machine; and the brand name of the machine.

Given below is an example of a machine description file using the syntax defined above:

```
// System: gen release: 2.12
K01 "Tower/Kid 604 BULL"
KA1 "Tower/Kid 620 BULL"
K04 "Tower/Kid 604 OEM"
KA4 "Tower/Kid 620 OEM"
```

Using an adaptation of the analysis engine, it is possible to define another format for describing the registers and the interpretation rules without going beyond the scope of the present invention, for example using the language XML, or "eXtensible Markup Language."

What is claimed is:

1. A process for analyzing and locating hardware failures in a computing machine storing information on operational errors generated by various sensible hardware components of the computing machine, characterized in that it comprises creating a man/machine interface, using the man/machine interface to describe components and rules for interpreting errors in a structural language, error information generated in accordance with the value of one or more status registers of the machine, using the component descriptions and rules for interpreting parameters in correlation with the error information to detect a malfunctioning component, determining the parameters from machine status registers and contents of the status registers of the machine, describing the status registers of the machine, describing the content of said status registers, and describing the set of interpreting rules for extracting the location of the failure from the contents of the registers in order to determine the parameters required for the description of components, the description of the content of the status registers, and for the description of the rules.

2. A process according to claim 1, further comprising:

identifying, among all described status registers, the status registers that have determined the error information;

comparing the values of the status registers identified as having determined the error information with the values of the status registers described; and locating a malfunctioning component or components based on the result of the comparison and on the interpretation rules described.

3. A tool for analyzing and locating hardware failures in a computing machine comprising a memory for storing error information generated by sensible components of the machine, said error information determined by the value of one or more status registers of the sensible components, an error analysis engine for receiving through a first series of inputs, error information, and for receiving through a second series of inputs, parameters required for description of the content of the status registers, for description of the sensible components of the machine, and for description of rules for interpreting errors, and a man/machine interface between the tool and a component expert to allow said component expert to formulate the parameters in a structured language.

4. A tool according to claim 3, characterized in that the error analysis engine includes a read module receiving through the first series of inputs, the error information, and an analysis module receiving through the second series of inputs, the parameters, supplied by the man/machine interface.

5. A tool according to claim 3, characterized in that the parameters are stored in an electronic file.

6. A tool according to claim 4, characterized in that the parameters are stored in an electronic file.

7. A tool according to claim 5, characterized in that the electronic file is stored on a removable medium.

8. A tool according to claim 6, characterized in that the electronic file is stored on a removable medium.

9. A tool according to claim 3, characterized in that the engine also receives, through the second series of inputs, system parameters for identifying a machine being analyzed.

10. A tool according to claim 4, characterized in that the engine also receives, through the second series of inputs, system parameters for identifying a machine being analyzed.

11. A tool according to claim 5, characterized in that the engine also receives, through the second series of inputs, system parameters for identifying a machine being analyzed.

12. A tool according to claim 6, characterized in that the engine also receives, through the second series of inputs, system parameters for identifying a machine being analyzed.

13. A tool according to claim 7, characterized in that the engine also receives, through the second series of inputs, system parameters for identifying a machine being analyzed.

14. A tool according to claim 8, characterized in that the engine also receives, through the second series of inputs, system parameters for identifying a machine being analyzed.

15. A computer for analyzing and locating hardware errors within a computer comprising a memory for storing error information generated by sensible components of the computer, said error information determined by the value of one or more status registers of the sensible components, an error analysis engine for receiving error information through a first series of inputs, and for receiving parameters through a second series of inputs required for description of the content of the status registers, for description of the sensible components of the computer, and for description of rules for interpreting errors, and a man/machine interface between the tool and a component expert to allow said component expert to formulate parameters in a structured language.

16. A computer according to claim 15, characterized in that the error analysis engine includes a read module receiving through the first series of inputs, the error information, and an analysis module receiving through the second series of inputs, the parameters supplied by the man/machine interface.

17. A computer according to claim 16, characterized in that the parameters are stored in an electronic file.

18. A computer according to claim 17, characterized in that the electronic file is stored on a removable medium.

19. A computer according to claim 18, characterized in that the engine also receives, through the second series of inputs, system parameters for identifying the hardware being analyzed.

20. A computer according to claim 17, characterized in that the engine also receives, through the second series of inputs, system parameters for identifying the hardware being analyzed.

21. A computer according to claim 16, characterized in that the engine also receives, through the second series of inputs, system parameters for identifying the hardware being analyzed.

22. A computer according to claim 15, characterized in that the parameters are stored in an electronic file.

23. A computer according to claim 22, characterized in that the electronic file is stored on a removable medium.

24. A computer according to claim 23, characterized in that the engine also receives, through the second series of inputs, system parameters for identifying the hardware being analyzed.

25. A computer according to claim 22, characterized in that the engine also receives, through the second series of inputs, system parameters for identifying the hardware being analyzed.

26. A computer according to claim 15, characterized in that the engine also receives, through the second series of inputs, system parameters for identifying the hardware being analyzed.

* * * * *